June 2, 1931.  H. E. CHARLES  1,808,018
LAGGING FOR REELS
Filed April 1, 1930
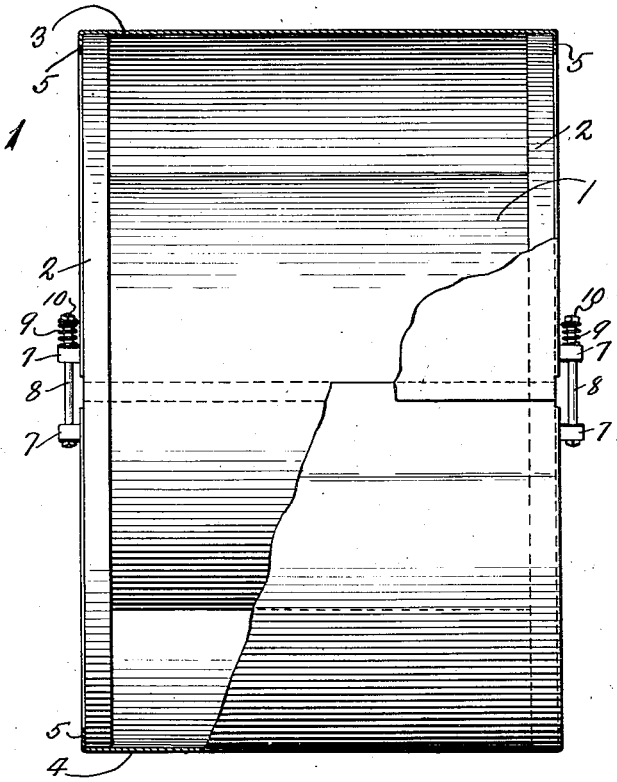
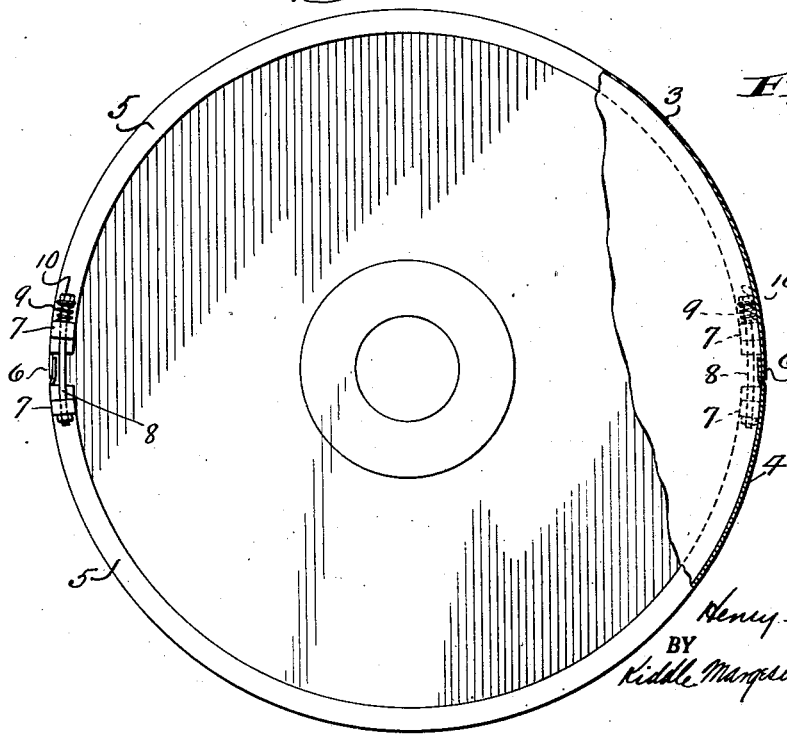
INVENTOR.
Henry E. Charles
BY
Kiddle Margeson and Horridge
ATTORNEYS.

Patented June 2, 1931

1,808,018

UNITED STATES PATENT OFFICE

HENRY E. CHARLES, OF PATERSON, NEW JERSEY, ASSIGNOR TO THE OKONITE COMPANY, OF PASSAIC, NEW JERSEY, A CORPORATION OF NEW JERSEY

LAGGING FOR REELS

Application filed April 1, 1930. Serial No. 440,654.

My invention relates to an improvement in lagging for shipping reels for electric cables, and has for one of its objects the provision of a lagging of simple and inexpensive construction which will overcome the difficulties experienced with the usual form of lagging now employed.

Shipping reels for electric cables as at present constructed are usually equipped with wooden lags extending lengthwise of the reel and spiked side by side to the end flanges of the reel to cover the reel and hence protect the cable.

In practice the cable is shipped on the reel; after the cable has been removed the reel is returned to the manufacturer of the cable who makes an allowance to his customer for the return of the reel. While this type of reel is almost universally used it is not entirely satisfactory owing to the type of lagging employed. For instance, the spikes by which the lagging is held in place often becomes loose in transit, permitting gravel and cinders and other foreign material to work into the cable through the spaces between the lags. At times some of the lagging works loose entirely in shipment, thereby exposing large areas of the cable to injury.

Then again, it will be appreciated that a great deal of labor and expense are involved in applying the lagging, culling the lags on the return of the reel and making repairs to the reel due to destruction of the reel flanges by the spikes, and so forth.

The present invention provides a lagging wherein all of these difficulties are overcome, the construction being such that no spikes or similar devices are required, and the flanges of the reel instead of being subjected to wear and tear are actually protected against injury.

In the drawings accompanying this application:

Fig. 1 shows an embodiment of my invention in part sectional side elevation; while Fig. 2 is an end view of the reel in part section.

The reel to which the lagging is applied comprises the usual hub 1 and end flanges 2. This construction is of wood. It will be understood, of course, that the reel is reinforced internally, etc., as is customary, but inasmuch as the construction of the reel per se is not a part of this invention these details are not shown.

3 and 4 designate metal strips constituting or making up my improved lagging. Each of these sections is semi-cylindrical and of such a length as to extend from flange to flange of the reel. Each lag section is provided at each end with downwardly extending annular flanges 5, which when the lagging is in position lie along the outer face of each of the end flanges of the reel so that the reel including the periphery of the reel flanges is completely enclosed. Preferably the lagging is applied so that the adjacent edges of the lagging sections overlap as shown at 6.

The annular flanges 5 on each section of the lagging are provided with pairs of opposed ears 7 which project out of the plane of the flanges, these ears being provided to receive securing bolts 8 by which the two sections of the lagging are drawn tightly about the reel and held to each other. Preferably the securing bolt is provided with a spring 9 between the ears and the nut 10 of each bolt to prevent the nuts 10 working loose during handling of the reel in shipment.

It will be seen from the foregoing, therefore, that my improved lagging is of such construction as to permit of the quick application and removal of the lagging, and eliminates entirely the use of fastening devices injurious to the flanges of the reel. It will be seen also that there is no opportunity for foreign material to work in between the lagging and the cable on the reel in that the reel is completely enclosed.

It will be appreciated, also, that my improved metal lagging affords protection to the flanges of the reel, the lagging functioning as a metal tire when the reel is rolled along the floor or other support.

What I claim is:—

1. Metal lagging for enclosing a reel for electric cables, said lagging being made in sections adapted to surround the hub and end flanges of the reel, and means carried wholly by the lagging for securing the sections to each other thereby to retain the lagging in place on the reel, said securing means being located at the outer face of each end flange and below the periphery thereof.

2. Metal lagging for cable reels, said lagging comprising a pair of semi-cylindrical sections adapted to surround the hub and end flanges of the reel, and means carried wholly by the lagging and lying along the outer face of each end flange of the reel and below the periphery thereof for drawing the two sections about the reel to secure the sections to each other and retain the lagging in place.

3. Metal lagging for cable reels, said lagging comprising a pair of semi-cylindrical metal sections adapted to surround and enclose the hub and end flanges of the reel, the ends of said sections being provided with annular flanges adapted to lie along the outer face of the reel flanges to prevent movement of the lagging longitudinally of the reel, and means carried by the lagging and lying along the outer face of each end flange below the periphery thereof for securing the sections of the lagging to each other.

4. Metal lagging for cable reels, said lagging comprising a pair of continuous semi-cylindrical metal sections adapted to enclose the hub and end flanges of the reel, each end of each section being bent out of the plane of the lagging to provide inwardly extending annular flanges adapted to lie along the outer face of each of the reel flanges, opposed ears on each of said lagging flanges, and bolts cooperating with said ears to draw the lagging about the reel and to secure the lagging sections to each other.

This specification signed this 25th day of March, 1930.

HENRY E. CHARLES.